UNITED STATES PATENT OFFICE.

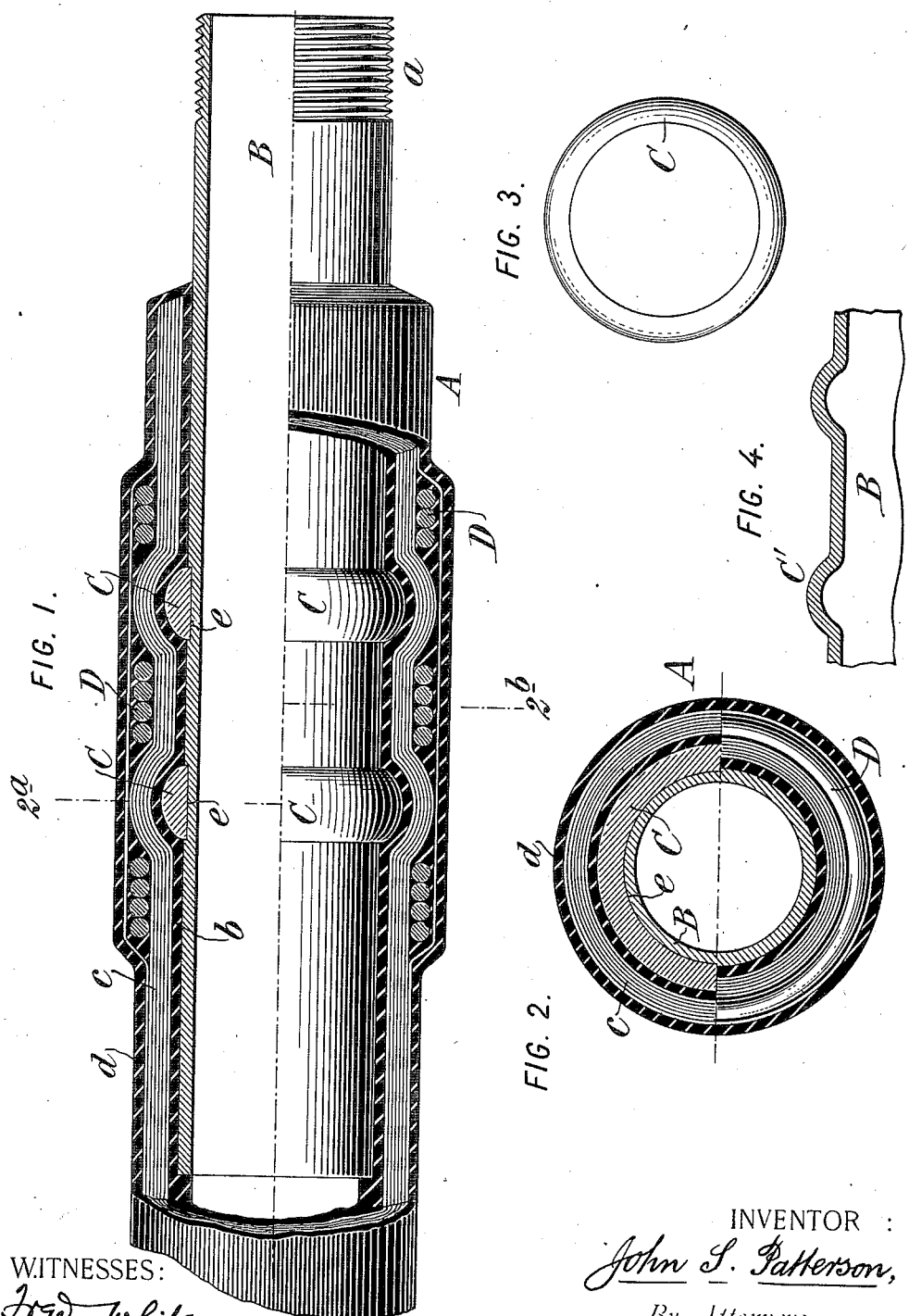

JOHN S. PATTERSON, OF CHELSEA, MASSACHUSETTS, ASSIGNOR TO REVERE RUBBER COMPANY, OF BOSTON, MASSACHUSETTS, A CORPORATION OF MASSACHUSETTS.

NIPPLE ATTACHMENT FOR RUBBER HOSE.

986,081.   Specification of Letters Patent.   Patented Mar. 7, 1911.

Application filed May 12, 1909. Serial No. 495,431.

*To all whom it may concern:*

Be it known that I, JOHN S. PATTERSON, a citizen of the United States, residing at Chelsea, in the county of Suffolk and State of Massachusetts, have invented certain new and useful Improvements in Nipple Attachments for Rubber Hose, of which the following is a specification.

This invention relates to means for attaching to a rubber hose the nipple or metallic pipe which enters the end portion of the hose and serves for connecting it to any piping system, such for example as water, steam or compressed air pipes.

The object of the invention is to provide a much stronger union than heretofore between the rubber hose and the metal nipple, and so strong that it is impossible by any pressure short of that which would destroy either the hose or the nipple, to blow the hose off the nipple.

The invention contemplates that the nipple, hose, and fastening device, shall all be vulcanized together so as to make the most intimate union possible.

In the accompanying drawings,—Figure 1 is a longitudinal mid-section partly in elevation, showing the preferred embodiment of my invention. Fig. 2 is a transverse section half in the plane of the line 2ᵃ and half in the plane of the line 2ᵇ in Fig. 1. Fig. 3 is an elevation of one of the rings. Fig. 4 is a fragmentary section of a modification.

Referring to the drawings, let A designate the rubber hose of any known or suitable construction, and B the nipple, which is a length of iron or other pipe, being commonly screwthreaded at $a$. The hose is shown with the usual inner lining of rubber $b$, and with as many layers or plies $c$ of duck or other woven fabric as are desired to give the requisite strength, and with an outer covering $d$, this being the usual construction of hose. The nipple is formed exteriorly with a suitable number of shallow grooves $e\ e$, which preferably should have abrupt shoulders or side walls. Into these grooves are shrunk rings C C, which are preferably rounded upon their outer surfaces so that when shrunk into the grooves they form rounded ribs or beads encircling the nipple at intervals. They should be suitably spaced apart to receive between them the clamping bands to be described. The nipple is best applied during the process of manufacture of the hose. Although it is possible with some kinds of hose to first form the hose and then force the nipple into place, yet it is preferable, and with especially stiff hose it is necessary, to insert the nipple before winding the fabric layers $c$ forming the wall of the hose. The fabric forming these layers is wound on so as to conform to the rings of the nipple, so that a perfect union is formed between the lining tube $b$ and the duck layers $c$ and the external surface of the nipple. When the necessary number of plies of fabric or duck have been wound on to make the wall of the unfinished hose of the desired thickness, and while the hose is still in the unvulcanized state, clamping bands D D are applied between and on each side of the rings C C. The best way to construct these bands is to wind wire under tension around the unfinished hose. The wall of the hose being at this time soft and pliable, allows the wire thus wound on under pressure to sink in and conform the fabric of the hose to the nipple between and on opposite sides of the rings. The ends of the wires are fastened in any suitable way, preferably by soldering them together, this being done while still under tension, so that it keeps the wire from slipping or relaxing. At this stage the hose might be vulcanized, but it is preferable for the sake of appearance to then cover the wire bands with rubber and one or more plies of duck, and apply the outside covering of rubber, which is usually applied on the outside of all hose; and which in this case is made continuous over the joint with the opposite covering on the body or main length of the hose. The hose is then vulcanized so that the nipple is made as it were a component part of the hose, being so intimately united that it is absolutely impossible to blow it out by any pressure that both the hose and the pipe could withstand. If the wire were applied after the hose was vulcanized, it would be impossible to get the same compression as is attainable by applying it in the unvulcanized state, at which time it more readily compresses the rubber and fabric layers of the hose, and forms a more intimate union with the nipple.

Heretofore the methods of connection of a hose and nipple have been practically unsatisfactory for heavy purposes. By one method it has been customary to cut circumferential grooves in the nipple, and by winding a continuous coil of wire under pressure, covering the entire overlap of the hose on the nipple, it has been attempted to force the hose to enter these grooves. This method answers for moderate pressures, but with high pressures the entry of the soft rubber lining of the hose into the shallow grooves affords insufficient hold to resist the pressure, and the hose blows off the nipple. Another method commonly used consists in similarly forming the nipple with shallow grooves, forcing the nipple into the hose, and then applying clamping rings around the hose which, when drawn together by their screws, are supposed to compress the hose into the grooves; but in applying these rings it is very difficult to locate them so as to coincide with the grooves, there being no sufficient outward indication of the location of the grooves, so that the rings are often wrongly applied; and even when correctly applied they serve only to force the soft rubber lining of the hose into the shallow grooves, so that the hold is not sufficient to resist any very heavy pressure. By my invention the grooves in the nipple do not engage the rubber at all, but are merely designed to prevent any possible slipping of the rings which are shrunk into them. Indeed the grooves are not absolutely indispensable, since if the rings are merely shrunk upon the outer surface of the nipple they make a far stronger joint than with the constructions heretofore used. Instead of grooving the nipple, the rings may be otherwise fastened thereon, as for example by forging or welding them upon the nipple; or instead of rings applied upon the nipple, the latter may be upset in such manner as to swell it outwardly where the ridges formed by the rings are to come, as shown in Fig. 4, where B is the nipple and C' is the ridge or circumferential rib which constitutes the equivalent of the shrunk-on ring.

Under the old methods of connection with large discharge hose under heavy pressure, say hose of 8 inches diameter and 150 pounds per square inch, it is almost impossible to get a nipple to stay in the hose. By my method, with such hose I have applied a pressure of 550 pounds per square inch without the slightest effect upon the joint, which would have withstood a much higher pressure had the hose been sufficiently strong to endure it. This pressure was equal to a longitudinal pull of 32,000 pounds, whereas a third of this pressure would have blown out the nipple with either of the old methods of connection.

I claim as my invention:

1. A hose nipple connection comprising a hose formed of layers of fabric and rubber, a nipple having a cylindrical surface and a circumferential rib, said rib projecting beyond the normal internal diameter of the fabric layers, the latter being expanded over said rib, and clamping bands applied to the hose on either side of this rib to force the hose into intimate contact with the cylindrical surface of the nipple and embrace the rib between them, and the hose being vulcanized upon the nipple.

2. A hose nipple connection comprising a hose formed of layers of fabric and rubber, a nipple having externally a plurality of circumferential ribs, spaced apart and leaving a cylindrical surface of the nipple between them, said ribs projecting beyond the normal internal diameter of the fabric layers, the latter being expanded over said ribs, and a clamping band nearly as wide as such intervening surface applied to the hose between such ribs to force the hose into intimate contact with the cylindrical surface of the nipple between the ribs, and the hose being vulcanized upon the nipple.

3. A hose nipple connection comprising a hose of layers of rubber and fabric, a nipple having externally a plurality of circumferential ribs extending beyond the normal internal diameter of the fabric layer, and clamping bands applied to the hose non-coincidentally with said ribs, and the hose being vulcanized to unite the parts permanently.

4. A hose nipple connection comprising a hose, a nipple having externally a plurality of circumferential ribs, and clamping bands applied to the hose non-coincidentally with said ribs, the hose having an outer covering of rubber and fabric inclosing said bands, and the hose vulcanized to unite the parts permanently.

In witness whereof, I have hereunto signed my name in the presence of two subscribing witnesses.

JOHN S. PATTERSON.

Witnesses:
CHARLES M. ADAMS,
AUGUSTUS R. TAFT.